US007505960B2

(12) United States Patent
Travison et al.

(10) Patent No.: US 7,505,960 B2
(45) Date of Patent: Mar. 17, 2009

(54) SCALABLE RETRIEVAL OF DATA ENTRIES USING AN ARRAY INDEX OR A SECONDARY KEY

(75) Inventors: Daniel T. Travison, Carnation, WA (US); John A. Messec, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 11/280,797

(22) Filed: Nov. 15, 2005

(65) Prior Publication Data

US 2007/0112795 A1 May 17, 2007

(51) Int. Cl.
G06F 7/00 (2006.01)
(52) U.S. Cl. .......................................... 707/2
(58) Field of Classification Search ................. 707/2
See application file for complete search history.

(56) References Cited

U.S. PATENT DOCUMENTS

| 5,918,225 | A | * | 6/1999 | White et al. ................ 707/3 |
| 6,073,144 | A | | 6/2000 | van Hoff .................... 707/513 |
| 6,138,209 | A | | 10/2000 | Krolak et al. ............... 711/128 |
| 6,151,025 | A | | 11/2000 | Yen et al. .................... 345/418 |
| 6,381,607 | B1 | | 4/2002 | Wu et al. ..................... 707/100 |
| 6,553,370 | B1 | * | 4/2003 | Andreev et al. ............... 707/3 |
| 6,584,458 | B1 | | 6/2003 | Millett et al. ................. 703/3 |
| 6,665,210 | B1 | | 12/2003 | Harvey .................. 365/185.03 |
| 2004/0162813 | A1 | | 8/2004 | Hollingsworth ................ 707/3 |
| 2005/0027684 | A1 | | 2/2005 | Wang et al. ..................... 707/2 |
| 2005/0044134 | A1 | | 2/2005 | Krueger et al. ............... 709/201 |
| 2005/0195832 | A1 | | 9/2005 | Dharmapurikar et al. ..... 370/395.31 |

OTHER PUBLICATIONS

Plemmons, et al., "*Scaling SAS® Data Access to Oracle® RDBMS*," SAS Institute, Paper 151-28, available at http://www2.sas.com/proceedings/sugi28/151-28.pdf (copy of PDF enclosed entitled "Article 1," 6 pages).
Nieplocha, et al., "*Global Arrays: A Non-Uniform-Memory-Access Programming Model for High-Performance Computers*," Journal of Supercomputing, vol. 10, 1996 pp. 169-189, available at http://www.emsl.pnl.gov/docs/global/papers/tjs.pdf, (copy of PDF enclosed entitled "Article 2," 17 pages).
Lawlor, et al., "*Supporting Dynamic Parallel Object Arrays*," University of Illinois, available at http://charm.cs.uiuc.edu/papers/ArrayJournal03.pdf, (copy of PDF enclosed entitled "Article 3," 21 pages).

* cited by examiner

*Primary Examiner*—Charles Rones
*Assistant Examiner*—Fazlul Quader
(74) *Attorney, Agent, or Firm*—Workman Nydegger (57) ABSTRACT

Example embodiments improve the lookup times and modification costs of indexing on a dynamically sorted list by using a combination of data structures to determine index values for secondary keys and vice versa. More specifically, exemplary embodiments provide a combination of a binary tree (e.g., a balanced binary tree) with a lookup table (e.g., linear dynamic hash table) to provide scalable retrieval of entries by either an array index or a secondary key. For example, given a key, a hash thereof returns a node placement within a balanced binary tree. This positioning can then be used at runtime to determine an index value for a data record, resulting in a near real-time lookup cost. Also note that modifications, such as reordering, insertions, and deletions, become a function of the nodes depth in the binary tree, rather than a linear function of number of records within the data array.

23 Claims, 4 Drawing Sheets

SCALABLE RETRIEVAL OF DATA ENTRIES USING AN ARRAY INDEX OR A SECONDARY KEY

CROSS-REFERENCE TO RELATED APPLICATIONS

N/A

BACKGROUND

Background and Relevant Art

Computerized systems provide many advantages towards peoples' ability to perform tasks. Indeed, the computer system's ability to process information has transformed the way we live and work. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

The ability to process information is essential to the performance of a computing system. Typically, such information is stored in data structures, which provide a way of sorting data in a computer so that it can be used efficiently. For example, often elements are displayed to users as columns and rows in some form of a list using any number of programs (e.g., spreadsheets, file management systems, object management consoles, etc.). These lists may be dynamically arranged or sorted at runtime based on various fields within each element (e.g., alphabetically or numerically based on such things as data name, data size, date type, date of modification, or any other number of fields). Of course, there are many different kinds of data structures suited to different kinds of applications, and some are highly specialized to certain tasks.

For example, linked lists are data structures that consist of a sequence of nodes, each containing arbitrary data fields and one or two references ("links") pointing to the next and/or previous nodes. A linked list is called a self-referential data type because it contains a pointer or link to another data of the same type. Linked lists permit insertion and removal of nodes at any point in the list in constant time, but do not allow random access. Accordingly, linked lists are best suited for a list of data that will be accessed sequentially and updated often with insertions or deletions.

Arrays, on the other hand, are one of the simplest data structures that sequentially sort elements within blocks referenced by indices or subscripts. Arrays permit efficient (constant time) random access, but not efficient insertion and deletion of elements (which have a cost of O(n), where n is the size for the array). Consequently, arrays are typically most appropriate for sorting a fixed amount of data, which will be accessed in an unpredictable fashion. In addition to lack of scalability, arrays also suffer from performance issues when the consumer must reference entries or elements using a secondary key, rather than an index value or ordered key. In particular, when searching for an element within an array using a secondary key (which is sorted in some random order within the array), there are only a few current mechanisms available for performing such search.

One such technique is known as a linear or sequential search, which is an algorithm that operates by checking each element of a list until a match is found. As can be seen, this brute-force approach suffers a worst case cost of O(n); however, the cost can be decreased to O(n)/2 when the secondary keys are truly in random order. A binary search, on the other hand, provides a more efficient search, but can only be used to search a key ordered list. Other techniques that rely on caching mechanisms (such as Most Recently Used (MRU) algorithms) overcome some of the above runtime issues described above; however, these approaches also suffer from performance issues when access into the data structure is random. For example, if modifications to the data structure occur in some random ordering, or if a request to search items is random, starting the search at the most recently used data element does not necessarily ensure quick runtimes. Accordingly, the brute-force approach must again be used resulting in an O(n)/2 or greater cost. In fact, none of the tools currently available for searching data structures that support indexing on a dynamically sorted systems allow for both near real-time lookups without high scalability costs.

BRIEF SUMMARY

The above-identified deficiencies and drawback of current search tools for data structures that support indexing on a dynamically sorted system are overcome through exemplary embodiments of the present invention. For example, embodiments described herein provide for efficiently determining an index value for a recorded data item using a secondary key, while minimizing the number of index value updates needed based on modifications to the array of recorded data items. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for efficiently determining an index value for a record or recorded data item within a data array using a secondary key. A request to access a data element within a data array that sorts a list of data elements using indices is received. Each data element within the list includes at least one field that is considered a secondary key in that the list of data elements within the data array are arranged in a random order relative to their corresponding secondary key field. Further, a secondary key corresponding to the data element is received and a lookup table data structure is used to determine a node placement within a binary tree data structure corresponding to the secondary key. Based on the node placement within the binary tree, an index value is calculated for the data element, which can then be used in accessing at least a portion thereof. Note that the index value is an offset into the data array relative to other indices.

Other example embodiments provide for efficiently recalculating index values for recorded data items within a data array referenced using a secondary key. A lookup table data structure is generated that takes a secondary key from a data element within a data array and returns a node within a binary tree data structure. Based on the placement of one or more nodes returned using the lookup table data structure, index values are dynamically calculated, each of which provides an offset into the data array relative to the other indexes. Thereafter, the data array is modified by one or more of a reordering of data elements, an insertion of a data element, or a deletion of a data element. Based on the modification of the data array, a node count for each ancestor node above the modification is adjusted or updated. Based on the adjusted node count, index values for the nodes returned are dynamically recalculated without having to rebuild the lookup table data structure. As will be appreciated, such technique ensures that the adjustment of indices is a function of the depth of the modification within the binary tree, rather than a linear function of the number of data elements within the data array.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for providing scalable retrieval of entries or records by array index and/or by a secondary key. The embodiments of the present invention may comprise a special purpose or general-purpose computer including various computer hardware or modules, as discussed in greater detail below.

As previously mentioned, lookups in data objects or structures that support indexing on a dynamically sorted systems (e.g., file management systems, object management consoles, spreadsheets, etc.) as well as modifications to the data records therein (e.g., insertions and deletions) typically have a cost factor of $O(n)/2$ or greater, where n is the total number of recorded elements within the data object. Example embodiments improve the lookup times and modification costs by using a combination of data structures to determine index values for secondary keys and vice versa. More specifically, exemplary embodiments provide a combination of a binary tree (e.g., a balanced binary tree such as red-black tree) with a lookup table (e.g., linear dynamic hash table) to provide scalable retrieval of data records or entries by either an array index or a secondary key.

For example, given a secondary key, a hash of the secondary key returns a value of a node within a balanced binary tree. Each node within the binary tree provides a count size of the sub-tree represented by the node. This positioning or count size can then be used at runtime to determine an index value for a data record, resulting in a near real-time lookup cost of $O(\log(n))$. Also note that modifications, such as insert and remove operations, will update the node count for ancestor nodes within the binary tree. As such, these operations become a function of the nodes depth in the binary tree (an approximate cost again of $O(\log(n))$), rather than a linear function of number of records within the data array. Further note that because index values are dynamically calculated at runtime using the updated node counts, there isn't a need to rebuild the lookup table or other data arrays—again reducing the cost associated with modifications.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Figure 1:
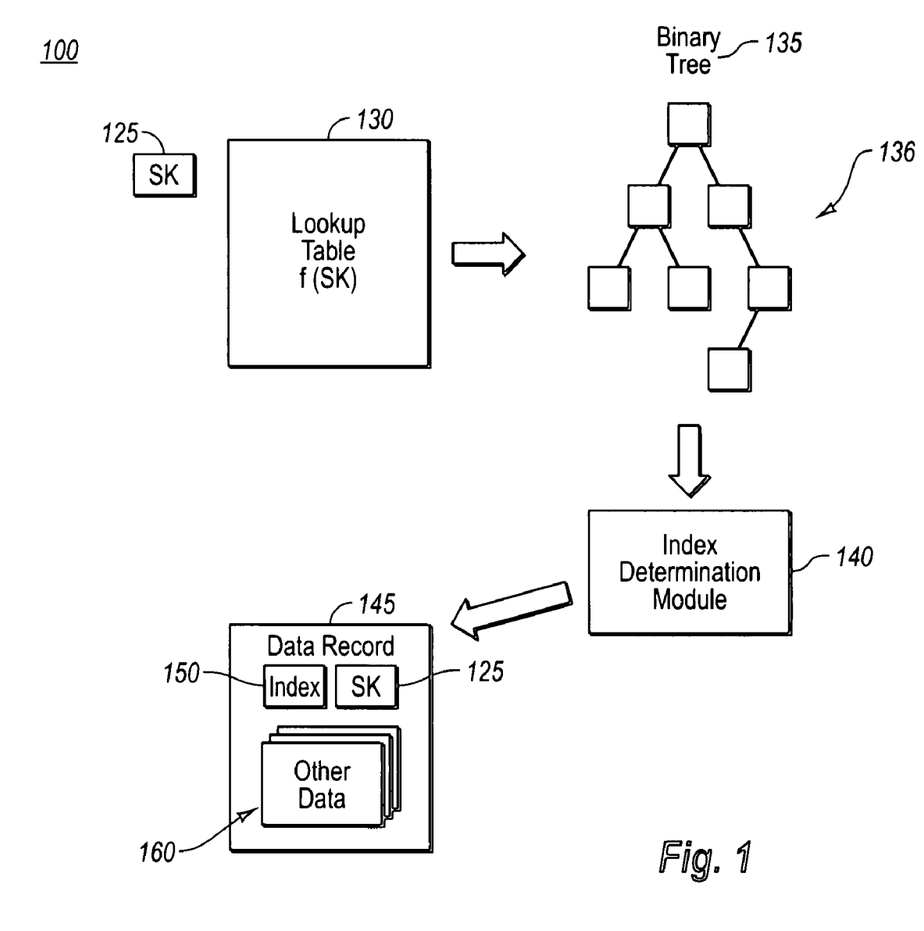
FIG. 1 illustrates a computing system that uses a combination of a lookup table and binary tree data structure to determine index values using secondary keys in accordance with exemplary embodiments.

FIG. 1 illustrates a computing system 100 that utilizes a combination of a binary tree (e.g., balanced binary red-black tree, splay tree, scapegoat tree, etc.) with a lookup table (e.g., linear dynamic hash table) to provide scalable retrieval of data records by an array index and/or by a secondary key. Prior to discussing FIG. 1 in detail, it will be helpful to describe terms that will be used throughout the specification. A data object, array, table, structure, and/or list describe a list of data records with various fields and keys associated therewith. Note that these terms are interchangeable as described herein. Further, a data element, item, entries, and/or record refer to specific data (e.g., a particular row) within a data object and are also used interchangeably herein.

A field or key (e.g., primary or foreign key), on the other hand, can refer to either a specific element, or may apply to every record within a data array (e.g., a specific column) based on the context used. For example, the use of a key without any specific value may refer to all items within a data structure, while a key with a given value may only apply to a single record. Further, note that the plural form of field or key may apply to multiple fields within a single record, within a list of records, or to a single key for multiple data elements—depending on the terms' use.

In any event, note that data arrays provide for an effective way of accessing data records a dynamically sorted system (e.g., a file management system, spreadsheet, object management system, etc.) in that the data items are stored using indices (regardless of the primary key sorting), which are offsets within the data array relative to each index. As such, a mapping between the various fields within a record and the index may allow for efficient lookup and retrieval of data elements. Modifications such as insertions and deletions into such lists, however, become relatively expensive. In particular, insertions or deletions modify the index count; and thus require reallocation of memory and copying the original array contents to the new allocation. Accordingly, the resulting cost of modifications becomes a linear function of the number of elements within the list.

In order to overcome these and other inherent deficiencies of current models for accessing and modifying data records, exemplary embodiments provide for both a lookup table 130 and a binary tree data structure 135 as shown in FIG. 1. This combination allows for scalable retrieval of entries or records 110 by array index and/or by a secondary key 125. For example, computing system 100 may receive a secondary key (SK) 125, which is considered secondary in that data records within a data object are in random order relative to the secondary key 125. The secondary key 125 may be the primary key (PK) of another data object (thus a foreign key to the data array) or it 125 may be from the same table where the array assigns indices based on a separate primary key and/or indexing scheme. Moreover, the secondary key 125 may be received, e.g., from a user interface during a query operation, or may be part of some other routine such as a reporting based on some reordering of data elements. Of course, how or why the secondary key 125 is received is not germane to embodiments described herein. In addition, note that the secondary key will typically be a unique key; however, embodiments also support duplication of secondary keys. Accordingly, any specific reference to how or why the secondary key 125 is received and/or the type of secondary key used is for illustrative purposes only and is not meant to limit or otherwise narrow the scope of embodiments described herein.

Regardless of the type, how, and/or why the secondary key 125 is received, the secondary key 125 may be looked up using lookup table 130 for identifying a node 136 positioning within the binary tree 135. Note that the lookup table 130 may be a data structure such as a linear dynamic hash function, although other similar lookup tables are available to the present invention. In any event, and as described in greater detail below, based upon the positioning of the node 136 identified using the secondary key 125, index determination module 140 dynamically calculates at runtime an index value 150 for the data record 145 that corresponds to the secondary key 125. Thereafter a user can use the index value 150 to obtain the data record 145 for perform any number of various actions, such as modification of the other data 160.

Note that although the present invention was described in FIG. 1 as going from a secondary key 125 to an index value 150 of a data array, the inverse flow is also contemplated by exemplary embodiments. In other words, and as described in greater detail below, an index value 150 may be received, wherein the nodes 136 of binary tree 135 can be iterated over to determine the corresponding secondary key 125—or other information for the data record 145. Accordingly, as described below, embodiments advantageously provide for a scalable retrieval of entries 145 by array index 150 or by secondary key 125.

Figure 2:
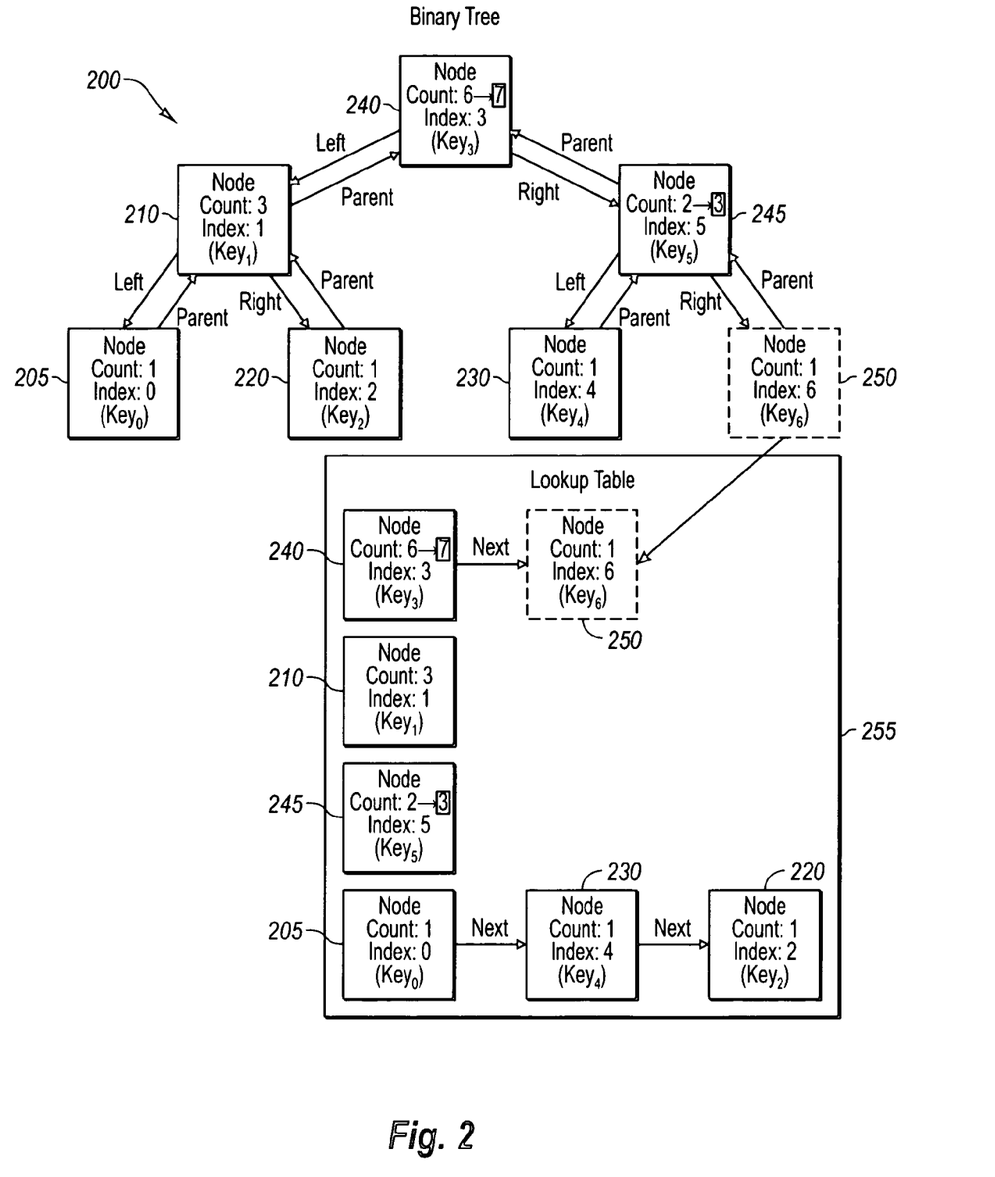
FIG. 2 illustrates an example of using and modifying the combination of a lookup table and binary tree when determining index values in accordance with exemplary embodiments.

In order to fully appreciate how the node 136 positioning within a binary tree 135 can be used to identify an index value 150 and/or a secondary key 125 (or other information for a data record 145), it will be useful to describe example algorithms that can be used for such calculations. Accordingly, FIG. 2 illustrates a binary tree 200 and lookup table 255 that may be used in accordance with exemplary embodiments. As shown within the binary tree 200, various nodes are provided that show a node count, index value, and a key (e.g., secondary key) associated therewith. Further, each node has an arrow that points to its corresponding parent, if any, and also points to any child nodes identified by left and right arrows. Each node is also provided in the lookup table as a series of buckets where nodes within a common bucket have "next" pointers to each of the various nodes therein.

Note that although the index values are shown within the nodes, they are actually dynamically calculated at runtime based on the node count and positioning within the binary tree 200. For example, calculating the array index of a node involves walking up the tree 200 and adding the number of entries to the left (Left Count) of the subject node wherein Left Count is calculated as follows:

Node.LeftCount = Node.Count − Node.Right.Count − 1
Node.RightCount = Node.Count − Node.Left.Count − 1

Calculating a node's array index is illustrated by the following logic or pseudo code:

```
index = pNode->LeftCount( );
Node * pParent = pNode ->Parent;
while (pParent != Nil)
{
    if (pParent ->Right = = pNode)
    {
        // include parent's left node count
        //and the parent node in the index.
        index += pParent ->LeftCount ( ) +1;
    }
    pNode = pParent;
    pParent = pNode ->Parent;
}
return index;
```

In other words, as noted in the algorithm, the index value can be calculated by: (1) taking the node count of a particular node; (2) subtracting out any decedents to the nodes right; (3) subtracting out one count for the node itself; and (4) adding any ancestors to its true left. For example, take node 245 without its right child node 250. The initially node count for node 245 is two, as indicated by the number "2" outside the square box. More specifically, the node count is a count of the child nodes (in this case child node 230 to node 245's left) as well as a count for the node's itself, which in this case is one. Accordingly, as previously mentioned, node 245 has a child count of two.

Using the child count of two and subtracting out any decedents to its right, which in this case is zero since we are not including node 250, we get a modified node count again of two. Then taking the modified node count and subtracting the node itself 245, we now have a node count of one. Adding all of the ancestors to its true left, which includes nodes 205, 210, 222, and 240 (i.e., 4+1), produces a index value of five as indicated by the "5" value within the node itself. Accordingly, given a secondary key and using the above-identified logic, any node can be identified within the binary tree 200 and its index value dynamically calculated by using the lookup table 255 identifying the particular node placement and calculating its index value as described.

Note that the lookup table 255 and binary tree 200 or nodes therein may be the same data object. Such consolidation or combination reduces the amount of memory needed for pointers. Note, however, exemplary embodiments provided herein can still be utilized using separate data structures, but the cost of storing such pointers produces an additional memory cost.

Note also that because index values are calculated at runtime, as the data records or elements (and corresponding nodes) are modified by a reordering, insertion, and/or deletion, all that is needed is a modifying of the node counts relative to the insertion. Such operations now become a cost as a function of the nodes depth in the tree rather than a linear function of the number of elements within the data array.

For example, if we now add node 250 (assume its ordering value is greater than index "5" since it is the right child of node 145 in accordance standard requirements of self-balancing binary trees), its parent node now becomes node 245. Accordingly, node 250 now has a node count of "1" (for itself) and also gets added in lookup table 255. Node counts are then updated for each ancestor above the node 250. More specifically, parent node 245 updates its count from "2" to "3" (as indicated in the rectangular box) and the ancestor node 240 updates its count from "6" to "7" (also shown in a rectangular box). Using the algorithms previously described, any index offset can now be calculated at runtime by retrieving the updated node count using the lookup table 255 then walking up the tree and adding the counts to all entries left of the requested item.

For instance, if the index value for node 240 is desired, its key (key$_3$) can be hashed and the position within the binary tree 200 identified. Thereafter, its index value can be dynamically calculated using its updated node count of "7", which in this 0 c instance still returns an index value of "3"—i.e., node count (7)—right children (3)—itself (1)+true left ancestors (0)=index value (3).

Note that the above addition of node 250 resulted in an update of node counts and a constant time insert into the lookup table 255. Further, the addition became a function of the modification of ancestor nodes, rather than a linear function of the number of elements within the array. A better example of this might be the addition of a node to the left of the root node 240, e.g., adding node 205. In such instance, rather than modifying index values for nodes below this element 240, only the counts of its ancestors are modified i.e., nodes 210 and 240. The rest of the counts remain unchanged, however, the index values will be adjusted at runtime based on the node count update.

In other words, by using the binary tree 135, (e.g., a balanced binary tree such as a self balancing red-black tree, splay tree, scapegoat tree, etc.) insertions and deletions or other modifications such as reordering now become a function of the depth of the modification within the binary tree 135. Accordingly, the cost associated therewith is now O(log(n)) rather than a linear function of the number of data records within a data object. Note also, that lookup runtimes using the combination of the lookup table 130 and the binary tree data structure 135 also become more deterministic and approach a real-time cost.

With reference to the lookup table, note that node 250 was added to the first bucket that already had node 240 therein. Although such addition may seem random, typically the nodes position in the bucket of the lookup table 255 may be calculated via a distribution and MOD function (e.g., hash=distributive (key)); index=MOD (hash). This lookup table 255 may be a linear dynamic hash table that provides the secondary key to the node retrieval. Given a specific key node, the related tree-node is retrieved from the hash table 255. A node's array index is then calculated using the above described logic. As previously noted, this positioning within the hash table 255 may be the same as the positioning within the binary tree 200, thus not having the additional cost associated with pointers. The following pseudo code summarizes such hash:

```
pNode = Find (key);
return IndexOf (pNode).
```

Rather than walking up the tree when calculating the index given a key, retrieving a node or determining a secondary key thereof given an array index requires walking down the tree from the root node 240 and moving down the left or right sub-tree based on the target array index. The follow pseudo code illustrates one example of such corresponding logic:

```
pNode = Root;
nodeIndex = pNode->LeftCount ( );
while (nodeIndex != index)
{
    if (index < nodeIndex)
    {
        // move down left subtree
        pNode = pNode->Left;
        // index of this node
        nodeIndex -= pNode->RightCount ( ) + 1;
    }
    else
    {
        pNode = pNode->Right;
        nodeIndex += pNode->LeftCount ( ) + 1;
    }
}
return pNode;
```

The above pseudo code is generally a mechanism for traversing a binary tree 200 given a particular index. Generally, given an index value that is greater than the value of the current node traverses to the next child node on the right.

Whereas, if the given index value is less than the current node, the binary tree 200 is traversed to the left. For example, given index number "1", we start traversing the binary tree 200 at the root node 240. Noting that the given index value of "1" is less then node 240's index value of "3," we traverse to the left child node 210. Comparing the given index value of "1" to the node 210's index value of "1" means that we have arrived at the appropriate index since they equal each other. Note, that if the index value for node 210 did not equal the given index value of "1", the logic above would continue. Note also, that if the node count is not identified, then it may be inserted as a leaf node within the sub-tree.

Although the above described traversing of the binary tree 200 uses a right greater than and left less than methodology, other traversing schemes are also available to embodiments described herein. For example, a reverse order of scaling of binary tree 200 is also contemplated, wherein a given index value that is less than the current node scales to the right and a given index value that is greater than a current node traverses to the left child node. Of course, other well known mechanisms for traversing a balanced binary tree 200 (or any other similar data structure) are also contemplated and available to the present invention. Accordingly, any particular method of traversing the binary tree 200 given an index in order to identify a data record corresponding to the node of the given index value is used herein for illustrative purposes only and is not meant to limit or otherwise narrow embodiments described herein.

In order to fully appreciate various embodiments described above, it may be useful to describe a hypothetical use given specific data records to calculate index values given a secondary key (e.g., a foreign key). Note that the following example describes going from a foreign key to an index value in accordance with exemplary embodiments; however, as previously described the reverse logic of going from an index value to a foreign key or other data record is also available. Also note that the following example as shown in FIG. 3 uses two data structures or objects 305 and 310, but embodiments herein are equally applicable to a single data object.

Figure 3:
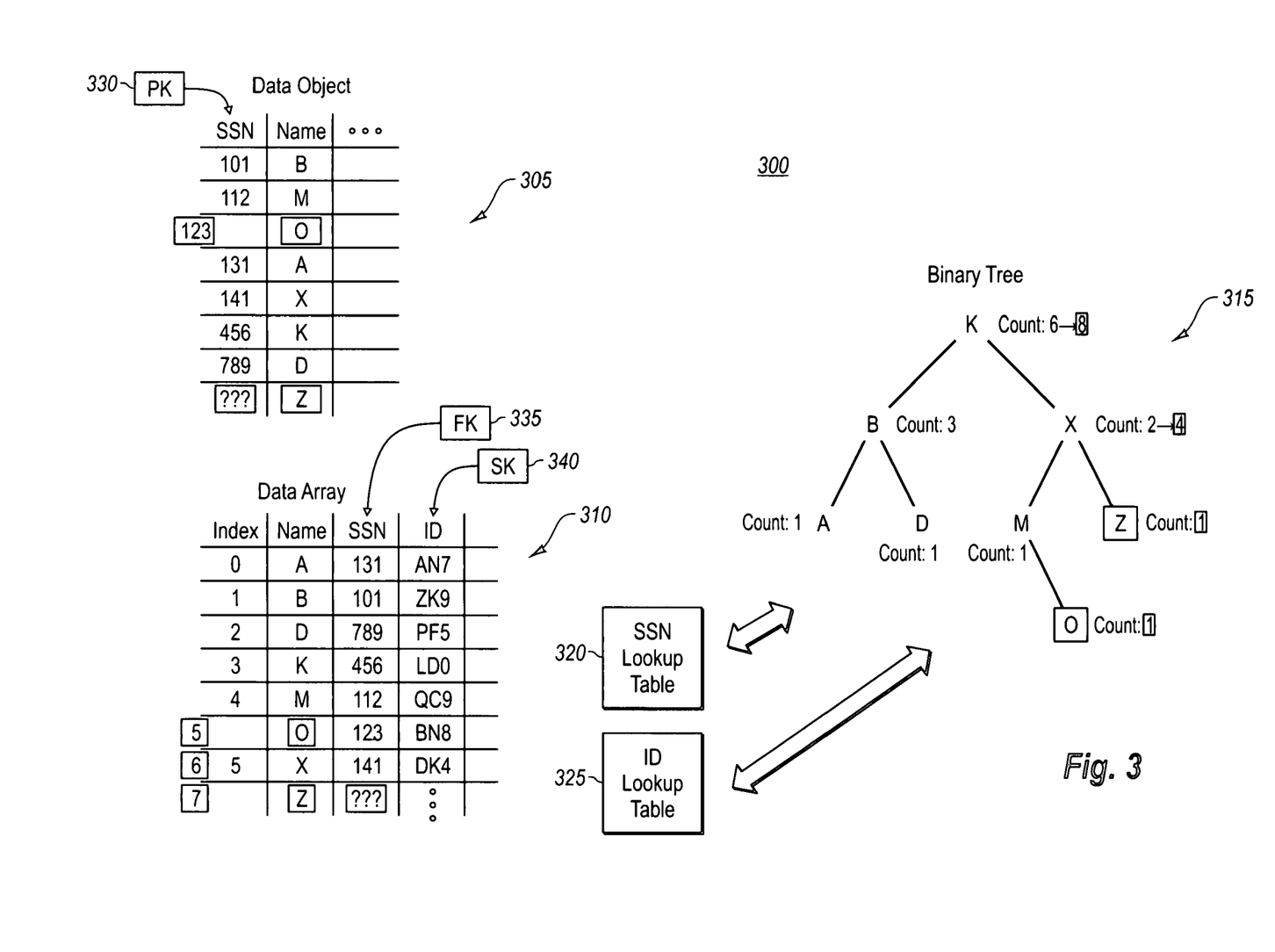
FIG. 3 illustrates an example of generating and updating a binary tree when modifying data records in accordance with exemplary embodiments.

FIG. 3 illustrates a specific example of using a primary key (PK) 330 from a data object 305 for identifying an index of a data array 310 using a lookup table 320, 325 and a binary tree data structure 315. Note that although the data objects, array, binary tree, and table lookups are shown as separate data structures, as previously noted these data structures may be correlated as a single object without pointers. In any event, note that data object 305 sorts its data records using a primary key 330 or a social security number (SSN). In the following example described, data element with SSN number "123" will be omitted from data object 305, and then subsequently added in a later discussion. Data array 310, on the other hand, is sorted by alphabetical ordering of name and in the first example, data elements "O" and "Z" will be omitted from the data array 310 and subsequently added. Note that although this data array uses an alphabetical ordering, such ordering is not necessary.

In any event, as previously mentioned, a combination of a lookup table 320 and a binary tree 315 are used to identify an index value for an entry or element given a primary key 330, which is a foreign key 355 within the data array 310. In other words, the SSN fields are a primary key 330 in the data object 305, which become a secondary or foreign key 335 in data array 310 in that the data elements are randomly ordered relative to the SSN numbers.

Given any of the SSN numbers 330 from the data object 305, we can use the SSN lookup table 320 to identify a node and use its count in accordance with the above described logic to determine its index value. For example, given SSN number "141" from data object 305, we can use the SSN lookup table 320 to identify the position of the node "X" within the binary tree 315. Initially, node "X" has a count of "2," and thus subtracting from the count any descendants to the right, subtracting itself, and adding the ancestors to its true left, yields an index value of "5." Of course, any of the other given SSN numbers can be used in a similar manner to dynamically determine the corresponding index value when retrieving or identifying data records within data array 310.

In accordance with another example embodiment, there may be provided a number of lookup tables 325 corresponding to other secondary keys (e.g., (SK) 340, which may be a foreign key; however, this assumes that the secondary key 340 is a primary key in another data structure) within the data array 310. For example, there may be another ID field 340 randomly ordered within the data array 310 relative to itself. Another lookup table such as a hash function or ID lookup table 325 can then be generated and used for identifying the corresponding index within the binary tree 315, and/or reverse logic can be used to determine the appropriate ID secondary key 340 for a particular data element. Of course, any number of lookup tables may be used in accordance with exemplary embodiments provided herein. Accordingly, the use of only two lookup tables as provided in FIG. 3 is for illustrative purposes only and is not meant to limit or otherwise narrow the scope of embodiments described herein.

Note that any modification of the binary tree 315 within the computing system 300 can occur without having to rebuild the lookup tables 320, 325. Although a rebuild of the binary tree 315 may be needed, it may be only necessary to update the pointers, but the node values themselves will typically not change. Accordingly, any type of modification including a reordering, insertion, deletions, or other modification has a cost of $O(\log(n))$.

For example, adding data elements "O" and "Z" causes a modification that is a function of the depth of the binary tree 315. In particular, placing node "O" within binary tree 315 shows that it will reside as a child node for node "M" with a count "1." Modifying the count moves "O's" parent node "M" to count "2", its ancestor node "X" to count "3", and its ancestor node "K" to count "7." Similarly, adding node "Z" with a count of "1" modifies its parent node "X" to count "4" and ancestor node "K" to count "8". These modifications now become a function of the depth of the modification within the binary tree 315, rather than a linear function of the number of data records within the data array 310. A more illustrative example of this, might be in the case where data element of SSN "131" corresponding to node "A" is added. Using the above logic only the count of node "B" and "K" are modified, as opposed to having to modify index values for every element within the data array 310.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagrams for FIGS. 4A and 4B—is used to indicate the desired specific use of such terms.

Figure 4A:
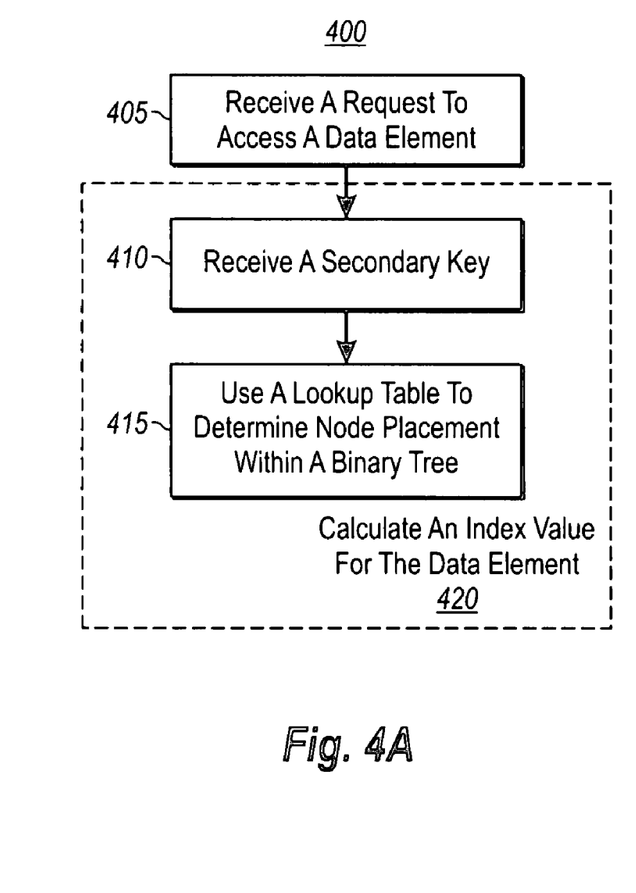
FIG. 4A illustrates a flow diagram of a method of efficiently determining an index value for a recorded data item within a data array using a secondary key in accordance with exemplary embodiments of the present invention.
Figure 4B:
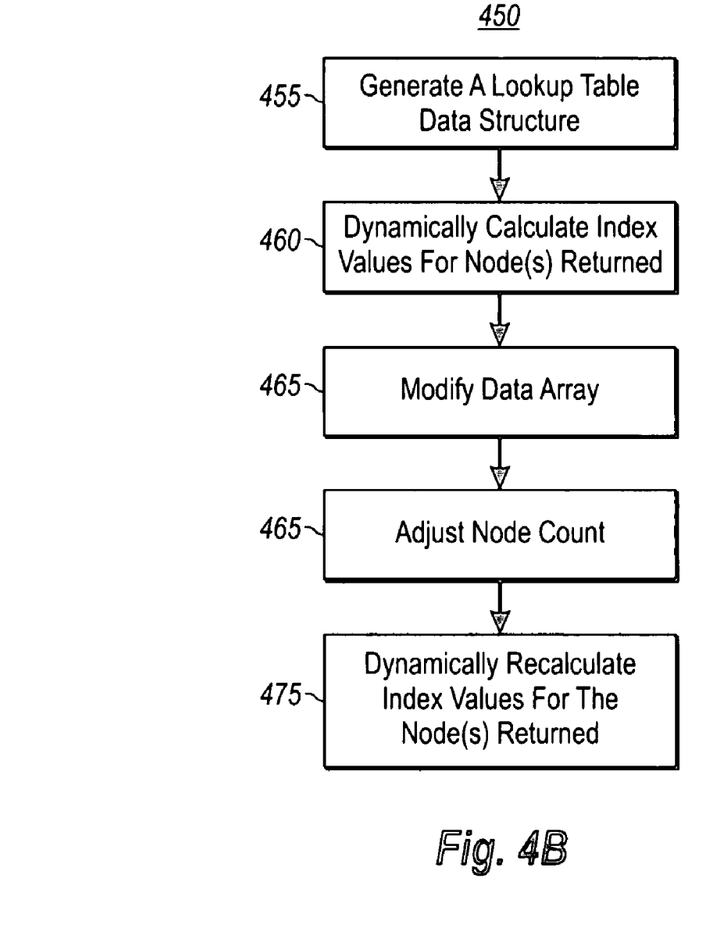
FIG. 4B illustrates a flow diagram of a method of efficiently recalculating index values for recorded data items within a data array referenced using a secondary key in accordance with exemplary embodiments.

As previously mentioned, FIGS. 4A and 4B illustrate flow diagrams for various exemplary embodiments of the present invention. The following description of FIGS. 4A and 4B will occasionally refer to corresponding elements from FIGS. 1-3. Although reference may be made to a specific element from these Figures, such references are used for illustrative purposes only and are not meant to limit or otherwise narrow the scope of the described embodiments unless explicitly claimed.

FIG. 4A illustrates a flow diagram for a method of efficiently determining an index value for a recorded data item within a data array using a secondary key. Method 400 allows for the minimization of the number index value updates needed based on modifications for recorded data items by using a combination of a lookup table and a binary tree. Method 400 includes an act of receiving 405 a request to access a data element. For example, computing system 100, 300 may receive a request by either a user interface or some other process to access a data element or record 145 within a data array 310 that sorts a list of data elements 145 using indexes. Each data element or record 145 within the list 310 includes a field that is considered a secondary key 125, 335, 340 in that a list of data elements 145 within the data array 310 are arranged in random order relative to their corresponding secondary key field 125, 335, 340. For example, the SSN and/or ID fields are secondary keys 335, 340 in data array 310 in that these values are arranged in random order relative to the ordering of the index values.

Method 400 also includes a step for calculating 420 an index value for the data element. More specifically, step for 420 includes an act of receiving 410 a secondary key. For example, secondary key 125, 335, 340 or other key may be received that corresponds to a data element or record 145 within a data object 305, 310. For example, the secondary key 125, 335, 340 may be a primary key 330 such as a SSN for a data element within data object 305. Of course, as previously described, the secondary key 125, 335, 340 may not correspond to a primary key 330 of another data object, but rather be part of the same data array 310 when doing some form of reordering or other modifications to the data array 310.

In any event, step for 420 further includes an act of using 415 a lookup table to determine node placement within a binary tree. For example, lookup table 130, 255, 320, 325 can be used to determine a node placement within a binary tree 135, 240, 315 corresponding to the secondary key 125, 335, 340. Note that the lookup table may be a linear dynamic hash table that hashes the secondary key 125, 335, 340 to identify a node that is in the binary tree 135, 240, 315, which will typically be a balanced binary tree such as a red-black tree, splay tree, scapegoat tree, etc.

Based on the node placement within the binary tree, an index value can be calculated for the data element used in accessing at least a portion thereof. Note, that the index value is an offset into the data array 310 relative to the other indices. For instance, using the algorithm identified above and the corresponding node counts within a binary tree 200, any one of the keys (i.e., Keys$_{1-6}$) can be looked up and its corresponding node identified in the binary tree 200. The nodes within the binary tree 200 are then traversed up from the identified node in the look up table 255 to the root node 240 for calculating the corresponding index value. For instance, node 220 with a count of "1" subtracts any child nodes to its right (which is zero), subtracts itself, and adds any ancestors to its true left (which includes nodes 210 and 240). Accordingly, this node placement within the binary tree 200 has a dynamic runtime index value of "2."

The above method may also include an act of receiving a request to modify data elements within a data array 310, a separate data object 305, or both. Such modification may include a reordering, insertion, or deletion of data elements 145 from the list of data elements 310, 305 such that the modification moves the placement of the node within the binary tree 135, 200, 315 to a new location. Thereafter, node updates may be preformed for each ancestor node above the modification, which includes an update of the node count from the node in the new location. For example, as previously described, adding node 250 from FIG. 2 updates the node count for the parent node 245 and the ancestor node 240.

Based on the new location, an index value for the data elements can be dynamically recalculated such that an update of the index is a function of the depth of the modification within the binary tree rather than a linear function of the number of data elements within the data array 305, 310. For example, as previously described regarding FIG. 3, if within binary tree 315 the node "A" is added to the data array 310, only the counts for its parent node "B" and ancestor node "K" are updated. Accordingly, any modification as reordering, insertions, and deletions become a function of O(log(n)), rather than O(n) function, where n is the number of elements within the data array 310.

Method 400 may also include an act of receiving a request to access the data element or record 110 within a data array, e.g., 310 using a second secondary key (e.g., secondary and/or foreign key ID 340 from data array 310), which is different from the original secondary key (e.g., FK SSN 335). Accordingly, a second lookup table, e.g., 325, is used to determine a node placement within the binary data tree 315 corresponding to the second secondary key 340. Based on the node place within the binary tree 315, and as previously described, the index value for the data element 145 may be calculated for use in accessing at least a portion of the data element.

FIG. 4B illustrates a flow diagram for a method 450 of efficiently recalculating index values for recorded data items within a data array referenced using a secondary key. Method 450 includes an act of generating 455 a lookup table data structure. For example, lookup tables 255, 320, 325 may be generated, which take secondary keys, e.g., 125, 335, 340, for a data element or record 145, 305, 310 within a data array 310 and return a node placement within a binary tree 135, 200, 315. Note that the lookup 130, 255, 320, 325 may be a linear dynamic hash table and the binary tree 135, 200, 315 may be a self-balancing binary tree such as a red-black tree, splay tree, scapegoat tree, etc.

Based on the placement of nodes returned using the lookup table data structure, method 450 also includes a step for dynamically calculating 460 index values for nodes returned. For example, as previously described using the algorithms noted above index values may be calculated for nodes within binary tree 135, 200, 315 based upon there placement when traversing up the binary tree and adding all ancestors to its left (or right as the case may be). Note that the index values determined provide an offset into the data array, e.g., 310, relative to the other indices.

Thereafter method 450 includes an act of modifying the data array. For example, data array 310 and/or other data objects 305 or data records 345 maybe modified by a reordering of data elements 145, insertion of data elements 145, or a deletion of data elements 145. Based on the modification of the data array, method 450 also includes an act of adjusting 470 a node count. For example, as previously described, when a modification to the binary tree 135, 200, 315 occurs, node counts are updated for each ancestor node above the modification, which minimizes the number of index value updates needed based on the modifications.

Accordingly, based on the adjusted node count, method 450 includes a step for dynamically recalculating 475 index values for the nodes returned. In other words, as previously described when adding, e.g., data elements "O" and "Z" to the binary tree 315, the adjusted node counts may be used for dynamically recalculating index values for anyone of the various nodes without having to rebuild the lookup table data 320, 325 in order to make the adjustment of indices a function of the depth of the modification within the binary tree rather than a linear function of the number of data elements within the array.

As before in other embodiments, note that a second lookup table may be generated that takes a second secondary key, e.g., ID field 340, and returns the same node within the binary tree data structure 315 that the original lookup table, e.g., 320 returned.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system that supports indexing on a dynamically sorted list of recorded data items, a method of efficiently determining an index value for a recorded data item within a data array using a secondary key, while minimizing the number of index value updates needed based on modifications of the plurality of recorded data items, by using a combination of a lookup table and binary tree, the method comprising:

receiving a request to access a data element within a data array that sorts a list of data elements using indices, wherein each data element within the list includes at least one field that is considered a secondary key in that the list of data elements within the data array are arranged in random order relative to their corresponding secondary key field;

receiving a secondary key corresponding to the data element;

using a lookup table data structure to determine a node placement within a binary tree data structure corresponding to the secondary key, wherein each node of the binary tree data structure comprises a node count value indicative of itself added to its number of descendant nodes; and based on the node placement within the binary tree, dynamically calculating an index value for the data element used in accessing at least a portion thereof, wherein the index value is an offset into the data array relative to the other indices, and wherein dynamically calculating the index value comprises: (1) taking the node count value of the particular node at the placement found in the lookup table data structure: (2) subtracting out any descendents to nodes right of the particular node in the binary tree data structure; (3) subtracting out one count for the particular node itself; and (4) adding any ancestors to a true left of the particular node.

2. The method of claim 1, wherein after the calculation of the index value for the data element, the method further comprises:

receiving a request to modify one or more data elements within the data array, a separate data object, or both, wherein the modification includes one or more of a reordering, insertion, or deletion, of a data element from the list of data elements, and wherein the modification moves the placement of the node within the binary tree to a new location;

updating node counts for each ancestor node above the modification, which includes an update of the node count for node in the new location; and based on the new location, dynamically recalculating an index value for the data element such that an update of the index is a function of the depth of the modification within the binary tree rather than a linear function of the number of data elements within the data array.

3. The method of claim 1, wherein the lookup table data structure is a linear dynamic hash table that hashes the secondary key to determine the node placement within the binary tree, which is a balanced data structure.

4. The method of claim 3, wherein the hashing of the secondary key produces the node within the binary tree in order to reduce memory consumption used by pointers.

5. The method of claim 3, wherein a data item returned by the hashing of the secondary key includes a pointer to the node within the binary tree.

6. The method of claim 3, wherein the balanced binary tree is one or a red-black tree, splay tree, or scapegoat tree.

7. The method of claim 1, wherein the secondary key fields correspond to primary keys of another data object, and wherein the another data object resides in a data structure separate from the data array in a distributed computing environment.

8. The method of claim 1, further comprising:

receiving a request to access the data element within the data array using a second secondary key different from the original secondary key;

using a second lookup table data structure to determine a node placement within the binary tree data structure corresponding to the second secondary key; and based on the node placement within the binary tree for the second secondary key, calculating the index value for the data element used in accessing at least a portion thereof.

9. The method of claim 1, wherein the request is made using a user interface.

10. In a computing system that supports indexing on a dynamically sorted list of recorded data items, a method of efficiently recalculating index values for recorded data items within a data array referenced using a secondary key, while minimizing the number of index value updates needed based on modifications of the plurality of recorded data items, by using node counts within a binary tree to dynamically calculate indices corresponding to the secondary keys, the method comprising:

generating a lookup table data structure that takes a secondary key for a data element within a data array and returns a node within a binary tree data structure, wherein each node of the binary tree data structure comprises a node count value indicative of itself added to its number of descendent nodes;

based on the placement of one or more nodes returned using the lookup table data structure, dynamically calculating index values for the one or more nodes returned, wherein the index values provide an offset into the data array relative to the other indices, and wherein dynamically calculating index values for the one or more nodes returned comprises, for each particular one of the one or more nodes returned: (1) taking the node count value of the node at the placement found in the lookup table data structure; (2) subtracting out any descendent nodes right of the particular node in the binary tree data structure; (3) subtracting out one count for the particular node itself and (4) adding any ancestors to a true left of the particular node;

modifying the data array by one or more of a reordering of data elements, an insertion of a data element, or a deletion of a data element;

based on the modification of the data array, adjusting a node count for each ancestor node above the modification; and based on the adjusted node count, dynamically recalculating index values for the one or more nodes returned without having to rebuild the lookup table data structure in order to make the adjustment of indices a function of the depth of the modification within the binary tree rather than a linear function of the number of data elements within the data array.

11. The method of claim 10, wherein the lookup table data structure is a linear dynamic hash table that hashes secondary keys to determine node placement within the binary tree, which is a balanced data structure.

12. The method of claim 11, wherein the balanced binary tree is one of a red-black tree, splay tree, or scapegoat tree.

13. The method of claim 10, wherein the secondary key fields correspond to primary keys of another data object, and wherein the another data object resides in a data structure separate from the data array in a distributed computing environment.

14. The method of claim 10, further comprising:
generating a second lookup table data structure that takes a second secondary key for the data element within the data array and returns the same node within the binary tree data structure that the original lookup table did.

15. In a computing system that supports indexing on a dynamically sorted list of recorded data items, a computer program product configured to implement a method of efficiently determining an index value for a recorded data item within a data array using a secondary key, while minimizing the number of index value updates needed based on modifications of the plurality of recorded data items, by using a combination of a lookup table and binary tree, the computer program product comprising one or more computer readable media having stored thereon computer executable instructions that, when executed by a processor, can cause the computing system to perform the following:

receive a request to access a data element within a data array that sorts a list of data elements using indices, wherein each data element within the list includes at least one field that is considered a secondary key in that the list of data elements within the data array are arranged in random order relative to their corresponding secondary key field;

receive a secondary key corresponding to the data element;

use a lookup table data structure to determine a node placement within a binary tree data structure corresponding to the secondary key, wherein each node of the binary tree data structure comprises a node count value indicative of itself added to its number of descendant nodes; and based on the node placement within the binary tree, dynamically calculate an index value for the data element used in accessing at least a portion thereof, wherein the index value is an offset into the data array relative to the other indices, and wherein dynamically calculating the index value comprises: (1) taking the node count value of the particular node at the placement found in the lookup table data structure; (2) subtracting out any descendents to nodes right of the particular node in the binary tree data structure;

(3) subtracting out one count for the particular node itself and (4) adding any ancestors to a true left of the particular node.

16. The computer program product of claim 15, wherein after the calculation of the index value for the data element, the computer program product further comprises computer executable instructions that, when executed by a processor, can cause the computing system to perform the following:

receive a request to modify one or more data elements within the data array, a separate data object, or both, wherein the modification includes one or more of a reordering, insertion, or deletion, of a data element from the list of data elements, and wherein the modification moves the placement of the node within the binary tree to a new location;

update node counts for each ancestor node above the modification, which includes an update of the node count for the node in the new location; and based on the new location, dynamically recalculate an index value for the data element such that an update of the index is a function of the depth of the modification within the binary tree rather than a linear function of the number of data elements within the data array.

17. The computer program product of claim 15, wherein the lookup table data structure is a linear dynamic hash table that hashes the secondary key to determine the node placement within the binary tree, which is a balanced data structure.

18. The computer program product of claim 17, wherein the balanced binary tree is one of a red-black tree, splay tree, or scapegoat tree.

19. The computer program product of claim 15, wherein the secondary key fields correspond to primary keys of another data object, and wherein the another data object resides in a data structure separate from the data array in a distributed computing environment.

20. The computer program product of claim 15, further comprising computer executable instructions that, when executed by a processor, can cause the computing system to perform the following:

receive a request to access the data element within the data array using a second secondary key different from the original secondary key;

use a second lookup table data structure to determine a node placement within the binary tree data structure corresponding to the second secondary key; and based on the node placement within the binary tree for the second secondary key, calculate the index value for the data element used in accessing at least a portion thereof.

21. The method of claim 1, wherein the binary tree and the lookup table are the same data structure and each node in the binary tree comprises one or more of a pointer to a parent or a pointer to a left, right, or both, child node in relationship thereto.

22. The method of claim 21, wherein each node within the binary tree is farther provided in the lookup table as a series of buckets where nodes within a common bucket have next pointers to each of the various nodes therein.

23. The method of claim 21 further comprising:

receiving a request to modify one or more data elements within the data array, a separate data object, or both, wherein the modification includes one or more of a reordering, insertion, or deletion, of a data element from the list of data elements, and wherein the modification moves the placement of the particular node within the binary tree to a new location;

updating node counts for each ancestor node above the modification, which includes an update of the node count for the particular node in the new location; and based on the new location, dynamically recalculating an index value for the data element such that an update of the index is a function of the depth of the modification within the binary tree rather than a linear function of the number of data elements within the data array.

* * * * *

UNITED STATES PATENT AND TRADEMARK OFFICE
CERTIFICATE OF CORRECTION

| | | |
|---|---|---|
| PATENT NO. | : 7,505,960 B2 | Page 1 of 1 |
| APPLICATION NO. | : 11/280797 | |
| DATED | : March 17, 2009 | |
| INVENTOR(S) | : Daniel T. Travison, Jr. et al. | |

It is certified that error appears in the above-identified patent and that said Letters Patent is hereby corrected as shown below:

In column 13, line 58, in Claim 1, delete "structure:" and insert -- structure; --, therefor.

In column 15, line 2, in Claim 10, after "itself" insert -- ; --.

In column 16, line 4, in Claim 15, after "itself" insert -- ; --.

In column 16, line 61, in Claim 22, delete "farther" and insert -- further --, therefor.

Signed and Sealed this

Third Day of May, 2011

David J. Kappos
*Director of the United States Patent and Trademark Office*